Nov. 23, 1965   D. C. REDICK ETAL   3,219,860
BRUSH RIGGING FOR DYNAMOELECTRIC MACHINES
Filed Sept. 21, 1961   4 Sheets-Sheet 1

INVENTORS
David C. Redick
Willard C. Shaw
Orza D. Heiny
BY
C. R. Meland
THEIR ATTORNEY INVENTORS
David C. Redick
Willard C. Shaw
Arza D. Heiny
BY
C. R. Meland
THEIR ATTORNEY.

Nov. 23, 1965   D. C. REDICK ETAL   3,219,860
BRUSH RIGGING FOR DYNAMOELECTRIC MACHINES
Filed Sept. 21, 1961   4 Sheets-Sheet 3

INVENTORS
David C. Redick
Willard C. Shaw
Arza D. Heiny
BY
C. R. Meland
THEIR ATTORNEY INVENTORS
David C. Redick
Willard C. Shaw
Arza D. Heiny
BY
C.R. Meland
THEIR ATTORNEY 3,219,860
BRUSH RIGGING FOR DYNAMOELECTRIC
MACHINES
David C. Redick and Willard C. Shaw, Anderson, and
Arza D. Heiny, Carmel, Ind., assignors to General
Motors Corporation, Detroit, Mich., a corporation of
Delaware
Filed Sept. 21, 1961, Ser. No. 139,746
12 Claims. (Cl. 310—239)

This invention relates to brush rigging for dynamoelectric machines and more particularly to brush rigging for an alternating current generator that has built-in diodes.

One of the objects of this invention is to provide a brush rigging for dynamoelectric machines wherein spring pressed brushes are located within a brush holder and wherein removable means are provided to maintain the brushes in a retracted position within the brush holder when the dynamoelectric machine is being assembled to thereby prevent the brushes from interfering with assembly of the machine.

Another object of this invention is to provide a brush rigging for an alternating current generator having built-in diodes, the brush rigging including a brush holder that supports a pair of brushes and a pair of male terminals, one of the male terminals being electrically connected with one of the brushes and the other male terminal being electrically connected to a junction point of a pair of diodes.

A further object of this invention is to provide an end frame assembly for a dynamoelectric machine wherein a brush holder is positioned within the end frame and is held to the end frame by a pair of metal fasteners, one of the fasteners serving to electrically connect one brush of the brush holder to the end frame and the other fastener fixing a male terminal in place that is electrically connected with another brush.

Still another object of this invention is to provide a brush rigging arrangement wherein a brush holder is fitted within a dynamoelectric machine end frame and is protected by the end frame and wherein removable rod means are provided which extend through the end frame to hold the brushes of the brush holder in a retracted position during assembly of the dynamoelectric machine.

Further objects and advantages of the present invention will be apparent from the following description, reference being had to the accompanying drawings wherein preferred embodiments of the present invention are clearly shown.

Figure 2:
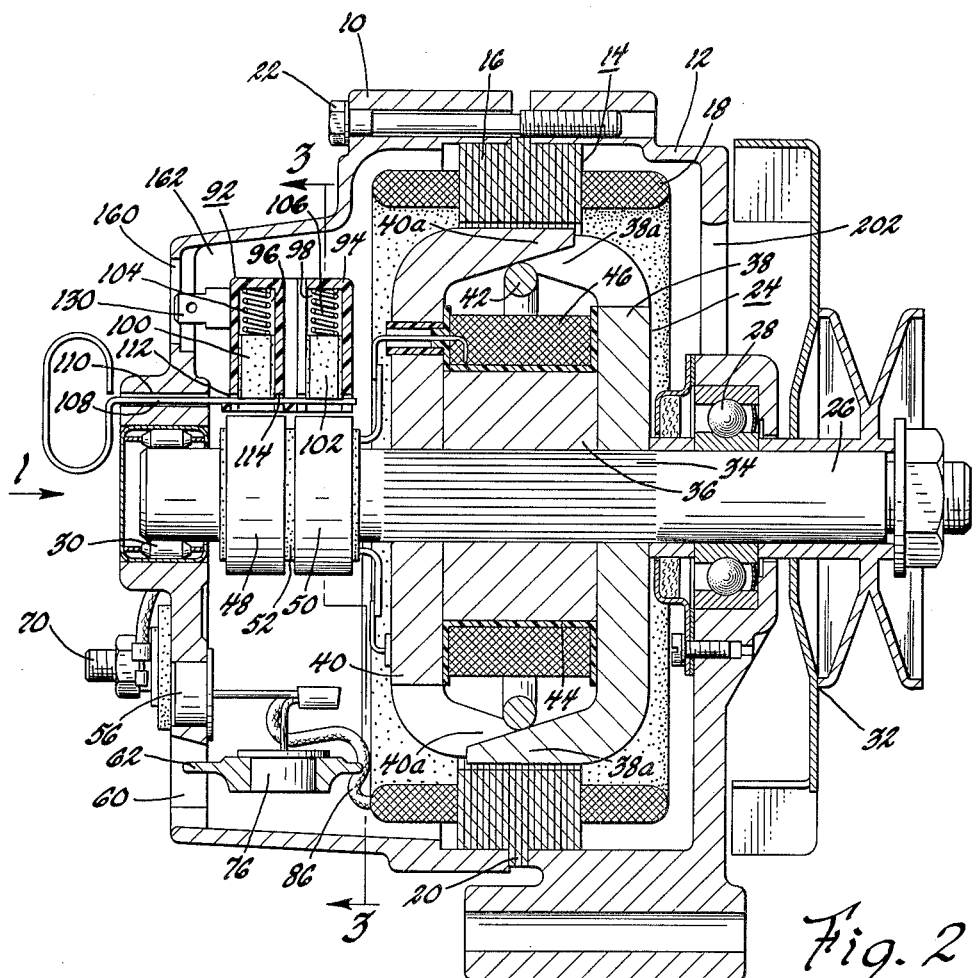
FIGURE 2 is a sectional view taken along line 2—2 of FIGURE 1.

Referring now to the drawings and more particularly to FIGURE 2, the reference numerals 10 and 12 designate end frames for an alternating current generator that are formed of a metal material such as die cast aluminum. The end frames 10 and 12 clamp a stator assembly generally designated by reference numeral 14. The stator assembly 14 includes a stack of steel stator laminations 16 and a three phase Y-connected stator winding 18 which is fitted within the slots formed in the stator laminations. The intermediate stator laminations are of a larger diameter and form an annular shoulder 20 which is clamped between the end frames 10 and 12. The smaller diameter stator laminations disposed on opposite sides of the larger diameter laminations 20 have an outer surface which engages the inner surface of the end frames 10 and 12. The end frames 10 and 12 are held together by bolts 22 which are threaded into bosses formed in the end frame 12.

The end frames 10 and 12 support a rotor assembly which is generally designated by reference numeral 24. The rotor assembly 24 includes a shaft 26 which is journalled in bearings 28 and 30 supported respectively by the end frames 12 and 10. The shaft 26 carries a combined pulley and fan which is designated by reference numeral 32.

The shaft 26 has a splined section 34. A core member 36 formed of a magnetic material is press fitted to the splined section 34. The pole members 38 and 40 are likewise press fitted to the splined section 34 so that the core member and pole members 38 and 40 rotate with the shaft 26. The pole member 38 has axially extending fingers 38a which interleave with the axially extending fingers 40a of the pole member 40. A noise suppressor ring 42 formed of a non-magnetic material such as aluminum engages the inner surfaces of the fingers 38a and 40a.

The core member 36 carries a spool 44 formed of electric insulating material and this spool carries a field coil wnding 46. The field coil 46 is connected with lead wires which are connected with slip rings 48 and 50 carried by an annular part 52 formed of electric insulating material. The part 52 is press fitted to the shaft 26 and therefore rotates with the shaft.

The end wall of the end frame 10 has three circular openings which respectively receive the semiconductor diodes 54, 56 and 58. The diodes are preferably of the pn junction semiconductor type and may be of the silicon type. Each diode has an outer metal case which forms one terminal side of the diode and each diode has a projecting terminal which forms the other electrical side of the diode. The outer metal cases of the diodes contact the circular walls of the openings formed in end frame 10 and the diodes are press fitted in these circular openings.

Figure 1:
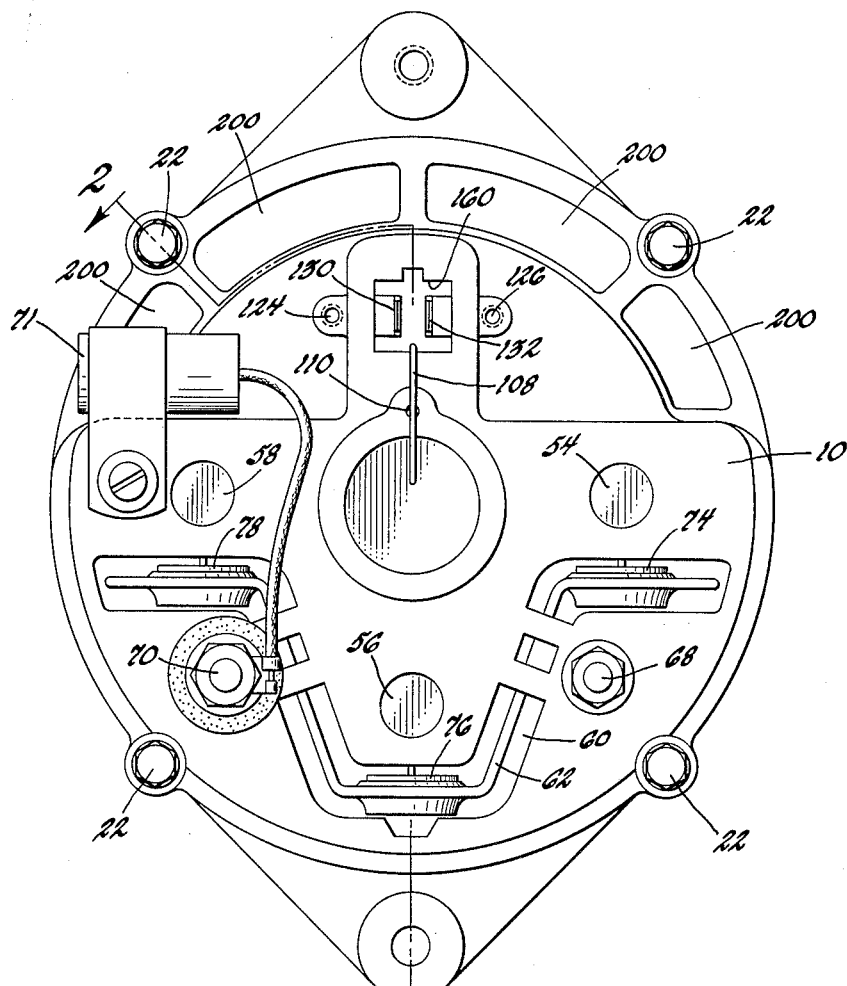
FIGURE 1 is an end view of a dynamoelectric machine that is fitted with a brush rigging made in accordance with this invention.
Figure 3:
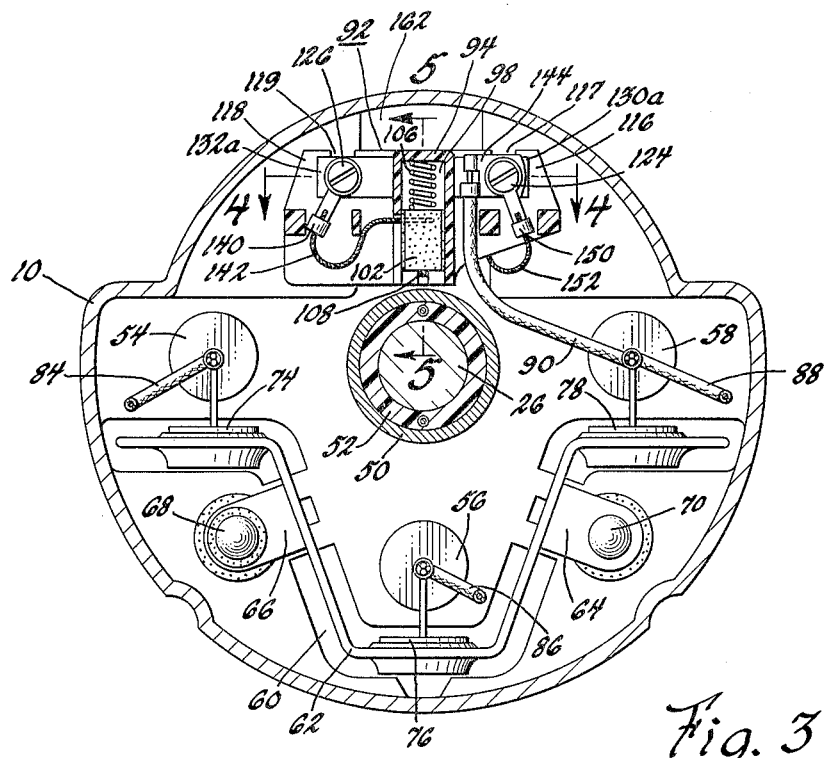
FIGURE 3 is a sectional view taken along line 3—3 of FIGURE 2.
Figure 5:
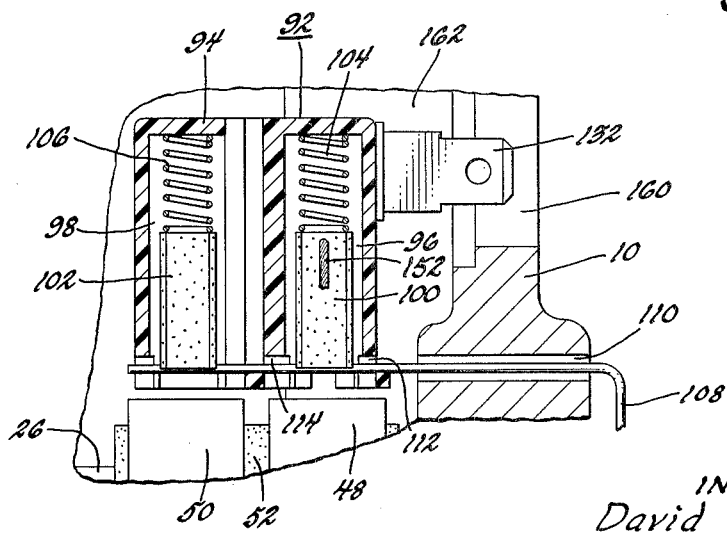
FIGURE 5 is an enlarged sectional view taken along line 5—5 of FIGURE 3.
Figure 4:
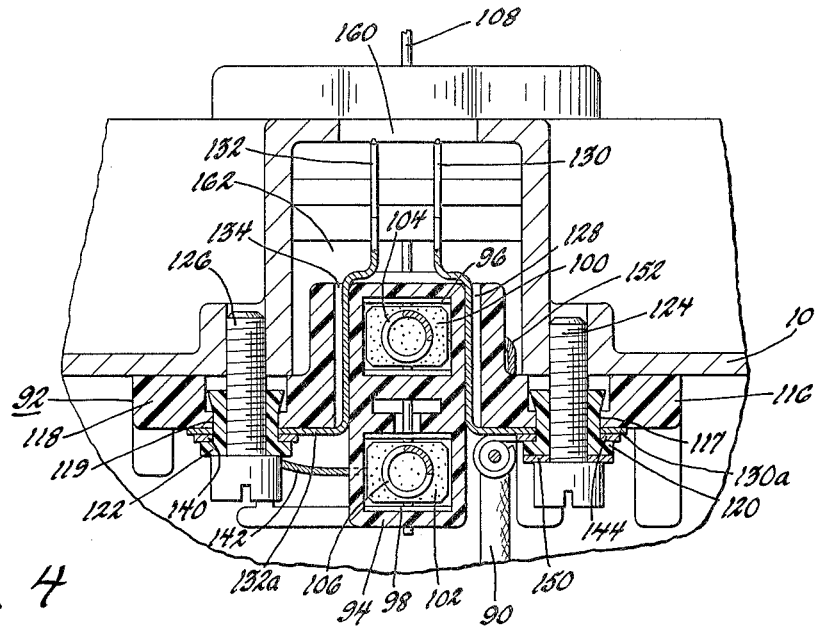
FIGURE 4 is an enlarged sectional view taken along line 4—4 of FIGURE 3.
Figure 6:
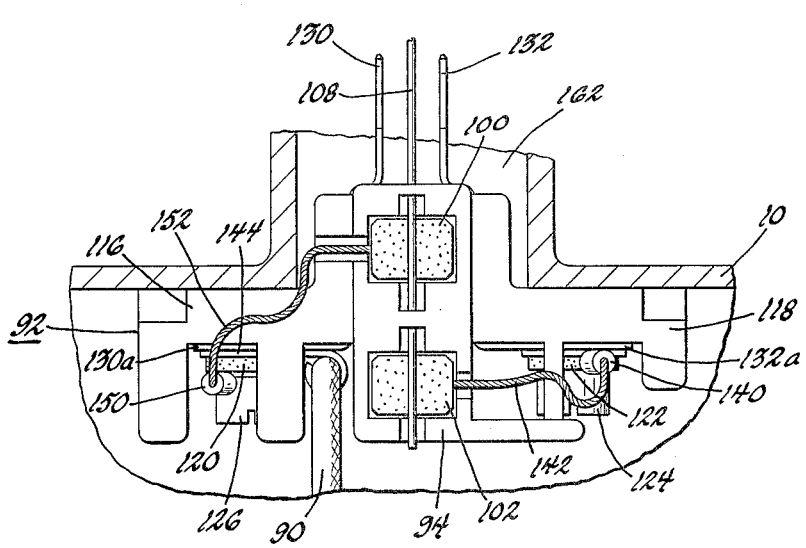
FIGURE 6 is a view partly in section illustrating the lower end of a brush holder assembly made in accordance with this invention.

The end frame 10 is formed with a generally U-shaped air inlet opening 60 as is clearly apparent from FIGURES 1 and 3. Positioned within the end frame 10, is a metal heat sink member 62 which has the same configuration as the slot 60. This metal heat sink member 62 is formed of a good heat conducting material such as aluminum and may be formed from sheet metal aluminum material or may be a die casting. The heat sink member 62 has integral flanges 64 and 66. A terminal stud 68 passes through openings in the end frame 10 and in the flange 66 to secure the heat sink member 62 to the end frame. A second terminal stud 70 passes through the end frame 10 and through the flange 64 to aid in the securement of the heat sink 62 to the end frame 10. The terminal stud 68 is electrically insulated from the heat sink flange 66 by suitable insulating material but is electrically connected with the end frame 10. The terminal stud 70 is electrically connected with the heat sink flange 64 but is electrically insulated from the end frame 10. A condenser 71 is connected between terminal stud 70 and the end frame 10 as is apparent from FIGURE 1.

It is seen from the foregoing that the terminal studs 68 and 70 secure the heat sink member 62 to the end frame 10 and serve as D.C. output terminals for the dynamoelectric machine. The terminal 68 will be at the same electrical potential as the end frame 10 whereas the terminal 70 will be at the same electrical potential as the heat sink 62. This is depicted in the circuit diagram of FIGURE 7.

The heat sink 62 is formed with three circular openings which respectively receive the diodes 74, 76 and 78. The diodes 74, 76 and 78 like the diodes 54, 56 and 58 each have an outer metal case forming one side of the diode and a projecting terminal forming the opposite side of the diode. The diodes 74, 76 and 78 are of a different conductivity type however as compared to diodes 54, 56 and 58. In other words, the metal cases of the diodes mounted in the heat sink 62 are of a different electric polarity from the outer metal cases of the diodes mounted in the end frame 10.

Figure 7:
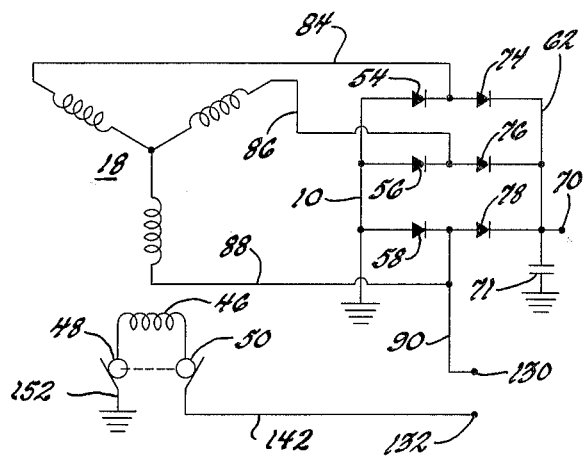
FIGURE 7 is a schematic circuit diagram of an alternator having built-in diodes and made in accordance with this invention.

The diodes are connected together and with the three phase Y-connected stator winding 18 in a manner illustrated in the schematic circuit diagram of FIGURE 7. Thus the projecting terminals of diodes 54 and 74 are connected together and to a lead wire 84 which is connected with one of the phase windings of the stator winding 18. In a similar fashion, the projecting terminals of diodes 56 and 76 are connected together and are also connected with a lead wire 86 which is connected with another phase winding of stator winding 18. The projecting terminals of diodes 58 and 78 are connected together and are connected with a lead wire 88 which goes to another phase winding of three phase stator winding 18. In addition, the junction of diodes 58 and 78 and the lead wire 88 is connected with the lead wire 90, the purpose of which is more fully described hereinafter. It can be seen from FIGURE 7, that the diodes are connected in a three phase full wave bridge rectifier network and that the heat sink 62 and the end frame 10 each form common connections for three diodes. It thus is seen that the terminal stud 70 will form one external D.C. output terminal for the generator whereas the terminal stud 68 which is connected with the end frame 10 forms the other D.C. output terminal.

The brush holder assembly for the dynamoelectric machine will now be described. The brush holder assembly is generally designated by reference numeral 92. This brush holding assembly includes a brush holder 94 which is formed of a suitable moldable plastic insulating material. The brush holder 94 has a pair of brush holding chambers 96 and 98 which receive the brushes 100 and 102. The brush 100 is urged into engagement with slip ring 48 by a spring 104 whereas the brush 102 is urged into engagement with slip ring 50 by a spring 106.

The brushes 100 and 102 are held in a retracted position away from the slip rings 48 and 50 during assembly of the end frames 10 and 12 by a rod member 108. The rod member 108 passes through an opening 110 formed in the end frame 10. This rod member also passes through openings 112 and 114 formed in the brush holder 94. When the end frames 10 and 12 have been assembled to the stator assembly 14, the rod member 108 can be pulled out and the brushes 100 and 102 are then pushed into engagement with the slip rings 48 and 50 by the springs. By keeping the brushes in a retracted position, the brushes do not interfere with the assembly of one end of the shaft 26 into the bearing 30 during the time that the end frames are being secured together.

The plastic brush holder 94 has side flanges 116 and 118 that are formed with slots 117 and 119 that respectively receive the insulators 120 and 122. Fitted within the insulator 120 is a metal fastener 124 which is threaded into the end frame 10. In a similar fashion, a metal fastener 126 passes through the insulator 122 and is likewise threaded into the end frame 10. The insulators 120 and 122 are preferably slitted longitudinally partly along their length so that they are expandable.

The brush holder 94 has a slot 128 which receives a male terminal 130. The male terminal 130 has an opening formed in a side flange 130a which receives the insulator 120. Another male terminal 132 is positioned within a slot 134 formed in the brush holder 94. The male terminal 132 has an opening in side flange 132a which receives the insulator 122 and it therefore is seen that the fasteners 124 and 126 and the insulators 120 and 122 serve to secure the male terminals 130 and 132 in place.

The insulator member 122 carries a terminal 140 which is connected with lead wire 142. The lead wire 142 is connected with the brush 102 and it therefore can be seen that the brush 102 is electrically connected with the male terminal 132.

The insulator member 120 carries a terminal 144 which is connected with lead wire 90. The lead wire 90 as pointed out hereinbefore is connected with the projecting terminals of diodes 58 and 78 as is seen from FIGURE 3 and the schematic circuit diagram of FIGURE 7. With this arrangement, it can be seen that the male terminal 130 is connected with the junction point of diodes 58 and 78 and this terminal can therefore be used to energize a relay coil or other device where the relay coil is connected with the male terminal 130 and with a D.C. output terminal of the bridge rectifier network.

The metal fastener 124 carries a terminal 150 which is connected with a lead wire 152. It is seen that the lead wire 152 is connected with the brush 100 and the brush 100 is therefore electrically connected to the end frame 10 by the metal fastener 124. It is of course appreciated that the insulator 120 insulates the terminal 150 from the male terminal 130 and also from the terminal 144.

The male terminals 130 and 132 are located in alignment with an opening 160 formed in the end frame 10 and it is seen that these male terminals and a portion of the brush holder 94 are located in a compartment 162 formed in the end frame 10.

In operation of this alternator and referring to FIGURE 7, it is seen that field current can be supplied to the field winding 46 via the terminal 132. This field current can be supplied from the three phase full wave bridge rectifier network that is built into the dynamoelectric machine through a suitable voltage regulating means. It is appreciated that as the rotor of the machine rotates and when the field winding 46 is supplied with direct current an alternating current is induced in the three phase stator winding 18. This is, of course, rectified to direct current by the built-in diodes which form the three phase full wave bridge rectifier network. During rotation of the rotor air enters the machine through openings 60 and 200 formed in end frame 10 and exits through openings 202 formed in end frame 12.

The brush holder of this invention has several advantages. By using the rod 108, it is possible to maintain the brushes out of the way when the end frames 10 and 12 are assembled together. In addition, the brush holder is positioned within a protected position in the end frame 10 and carries a pair of male terminals one of which can be connected with a voltage regulator and the other of which can be connected with a relay or other load to be actuated. It will of course be appreciated that a complementary female terminal may be plugged into the end frame 10 to receive the male terminals 130 and 132 making it a simple matter to connect the dynamoelectric machine of this invention with the other parts of this system that are required.

While the embodiments of the present invention as herein disclosed constiute a preferred form, it is to be understood that other forms might be adopted.

What is claimed is as follows:

1. An end frame assembly for a dynamoelectric machine comprising, a metal end frame, a brush holder formed of insulating material, first and second male terminals fitted within said brush holder, first and second metal fasteners for securing said brush holder to said end frame and for holding said male terminals in place, first and second brushes slidable in said brush holder, means electrically connecting one of said brushes with one of said fasteners, and means electrically connecting the other of said brushes with one of said male terminals.

2. A brush holding assembly for a dynamoelectric machine comprising, a body member formed of insulating material, first and second male terminals fitted in said body member, first and second metal fasteners for holding said male terminals in place in said body member, first and second brushes slidably disposed within said body member, means electrically connecting one of said brushes with one of said male terminals, first and second terminals carried by the other fastener one of which is electrically connnected with the said other fastener, a lead wire connecting said one of said terminals with the other of said brushes, a second lead wire connected with the other terminal, and means insulating said terminals from each other.

3. In combination, a dynamoelectric machine having an end frame, a brush holder, a brush slidably disposed in said brush holder, a metal fastener securing said brush holder to said end frame, a lead wire connected with said brush and with said fastener whereby said fastener electrically connects said brush with said end frame, a male terminal supported by said brush holder and held in place by said fastener, a second terminal supported by said fastener electrically connected with a lead wire and with said male terminal, and means insulating said second terminal from said fastener.

4. A brush holding assembly for a dynamoelectric machine comprising, a brush holder formed of insulating material, first and second slots formed in said brush holder, first and second male terminals located respectively in said slots, first and second insulator members positioned respectively within recesses formed in said brush holder, first and second metal fasteners passing respectively through said first and second insulator members for holding said male terminals in place within said first and second slots, and a terminal encircling one of said insulator members electrically connected with a brush slidably disposed in said brush holder.

5. A brush holding assembly for a dynamoelectric machine comprising, a brush holder formed of insulating material, first and second slots formed in said brush holder, first and second male terminals positioned respectively within said slots, first and second insulator members fitted respectively within openings in said first and second male terminals and located within recess means formed in said brush holder, a metal fastener passing through each of said insulator members, first and second brushes slidable in said brush holder, means electrically connecting one of said brushes with one of said male terminals, and means electrically connecting the other of said brushes with one of said metal fasteners.

6. A brush holding assembly adapted to be secured to a frame of a dynamoelectric machine comprising, a brush holder formed of insulating material, first and second male terminals supported by said brush holder, first and second annular insulator members, an opening in each of said male terminals receiving a respective insulator member, said insulator members being supported by said brush holder, and metal fastener means passing through each annular insulator member for securing said male terminals in place in said brush holder.

7. A brush holding assembly for a dynamoelectric machine comprising a brush holder formed of insulating material, a pair of brush holding chambers formed in said brush holder, a brush slidable in each chamber, first and second male terminals positioned respectively in first and second slots formed in said brush holder, first and second insulator members positioned respectively in first and second recess means formed in said brush holder, an opening in each male terminal receiving a respective insulator member, a metal fastener passing through each of said insulator members, a terminal carried by one of said insulator members and engaging one of said male terminals, means electrically connecting said terminal with one of said brushes, a terminal electrically connected with one of said metal fasteners, and means connecting said last-named terminal with the other of said brushes.

8. A brush holder assembly for a dynamoelectric machine comprising, a brush holder formed of insulating material, first and second brush holding chambers formed in said brush holder, a first brush slidable in said first brush holding chamber, a second brush slidable in said second brush holding chamber, first and second lead wires each carrying a terminal connected respectively with said brushes, first and second male terminals supported by said brush holder, and first and second fastener means for securing said male terminals to said brush holder and for supporting the terminals connected with said lead wires.

9. A brush holding assembly for a dynamoelectric machine comprising, a brush holder formed of insulating material, a male terminal located at least partially within said brush holder, a brush slidable in said brush holder, a lead wire connected with said brush, a second terminal connected with said lead wire, and a metal fastener for securing said male terminal to said brush holder and for supporting said second terminal.

10. In combination, a dynamoelectric machine having an end frame, a rotor for said dynamoelectric machine including a shaft, said shaft carrying a conductor that is rotatable with said shaft, a brushholder having at least a portion thereof located on the inner side of said end frame, a brush slidably supported by said brushholder, resilient means for urging said brush into contact with said conductor, an opening in said end frame, and at least one opening in said portion of said brushholder aligned with said opening in said end frame, a brush retaining means received by said aligned openings of said end frame and said brushholder, said brush retaining means when in position in said openings engaging said brush to hold said brush retracted from said conductor, said brush retaining means being removable from said openings through said opening formed in said end frame.

11. In combination, a dynamoelectric machine having an end frame, a rotor for said dynamoelectric machine including a shaft, one end of said shaft being rotatably supported by said end frame, said shaft carrying a conductor that is rotatable with said shaft, a brushholder having at least a portion thereof located on the inner side of said end frame, a brush slidably supported by said brushholder, resilient means for urging said brush into contact with said conductor, an opening in said end frame, and at least one opening in said portion of said brushholder aligned with said opening in said end frame, the axis of said aligned openings being substantially parallel to the axis of said shaft, a brush retaining means received by said aligned openings in said end frame and brushholder, said brush retaining means when in position in said openings engaging said brush to hold said brush retracted from said conductor, said brush retaining means being removable from said openings through said opening formed in said end frame.

12. In combination, a dynamoelectric machine having first and second separable end frames, a rotor assembly including a shaft journalled in bearings located in said end frames, slip rings carried by said shaft, a brushholder having at least a portion thereof located on the inner side of one of said end frames, said brushholder carrying brushes that are engageable with said slip rings, resilient means for urging said brushes into contact with said slip rings, an opening in said one end frame, at least one opening in said portion of said brushholder aligned with said opening in said one end frame, a brush retaining means received by said aligned openings in said end frame and brushholder, said brush retaining means when in position in said openings engaging said brushes to hold said brushes retracted from said slip rings, said brush retaining means being removable from said openings through said opening formed in said one end frame when said end frames are assembled.

References Cited by the Examiner

UNITED STATES PATENTS

| | | | |
|---|---|---|---|
| 1,034,408 | 8/1912 | Barnes | 310—247 X |
| 1,519,222 | 12/1924 | Seiss | 310—42 X |
| 1,760,874 | 6/1930 | Lansing | 310—240 |
| 2,128,598 | 8/1938 | Williamson | 310—240 |
| 2,780,949 | 2/1957 | Hay | 310—240 |
| 2,821,678 | 1/1958 | Hussey | 322—25 |
| 2,897,386 | 7/1959 | Jones | 310—239 |
| 2,947,895 | 8/1960 | Wrag | 310—239 |
| 2,972,712 | 2/1961 | Landstorfer | 322—25 |
| 3,001,121 | 9/1961 | Kerr | 310—72 |
| 3,075,110 | 1/1963 | Pepworth | 310—240 |

ORIS L. RADER, *Primary Examiner.*

MILTON O. HIRSHFIELD, *Examiner.*